May 21, 1929.  B. DEAN  1,714,161
GRAIN ROW HEADER
Filed April 4, 1927   3 Sheets-Sheet 2
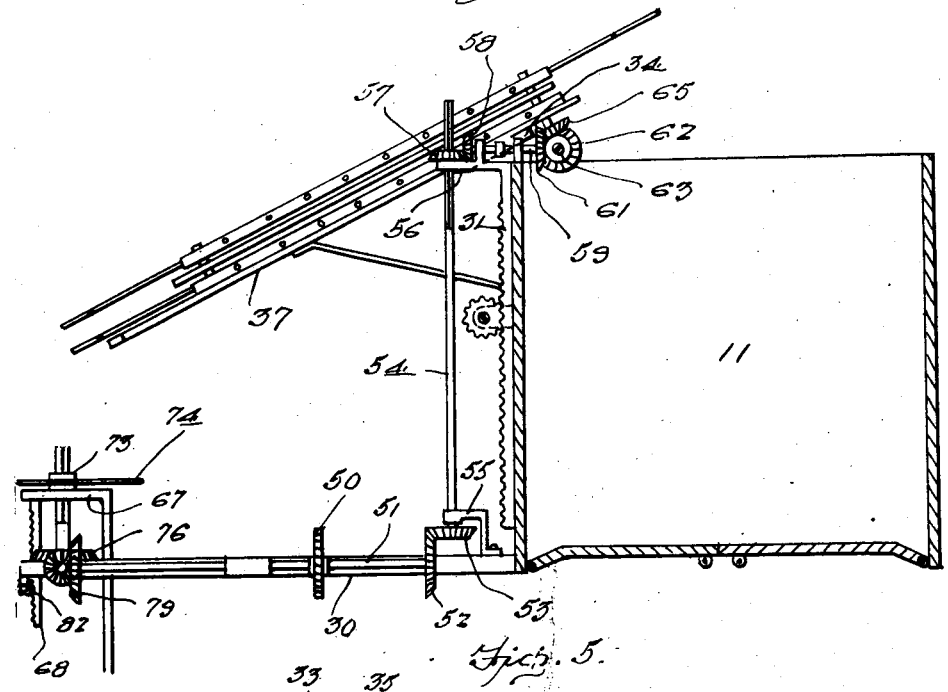
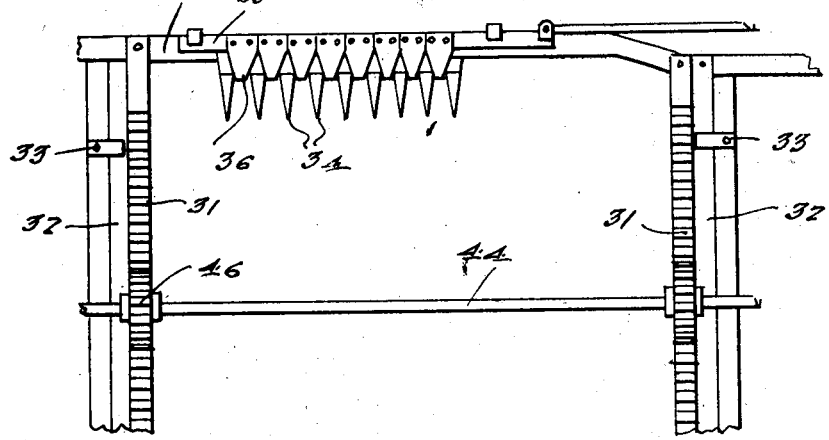
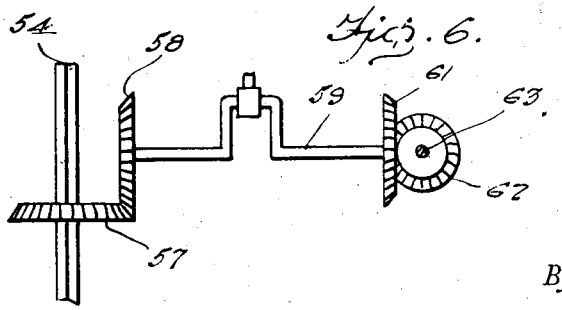
Inventor
Buck Dean
By Clarence A. O'Brien
Attorney May 21, 1929.  B. DEAN  1,714,161
GRAIN ROW HEADER
Filed April 4, 1927   3 Sheets-Sheet 3
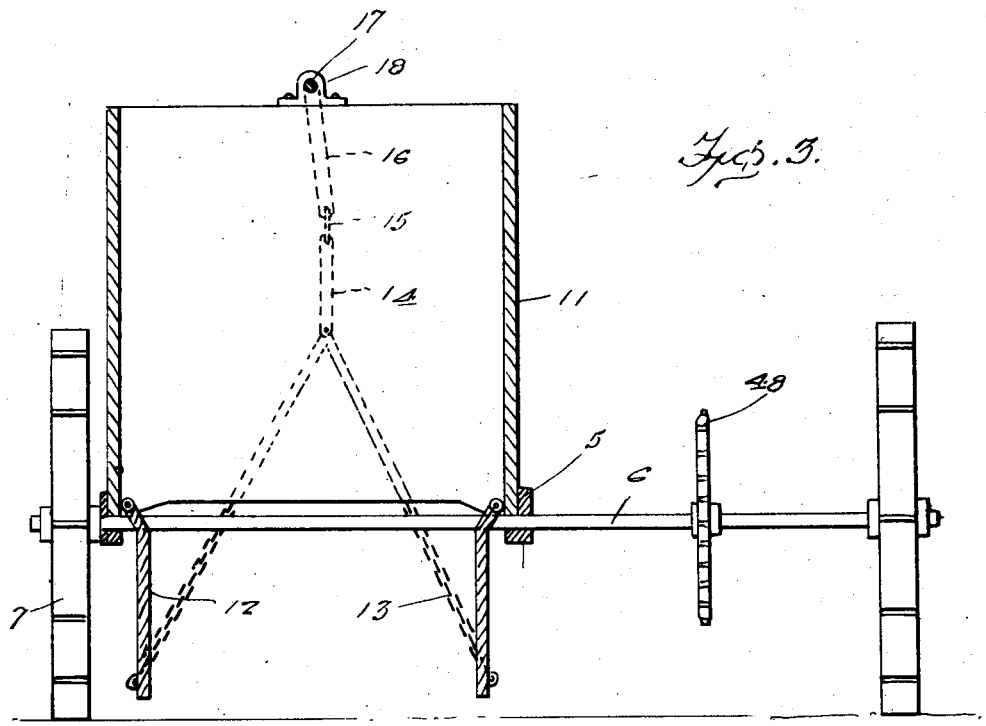
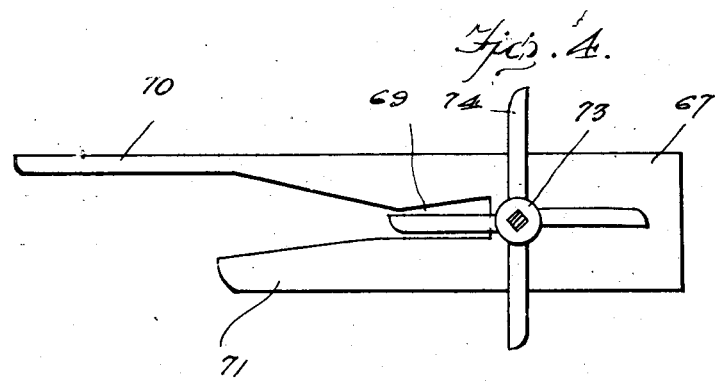
Inventor
Buck Dean Patented May 21, 1929.

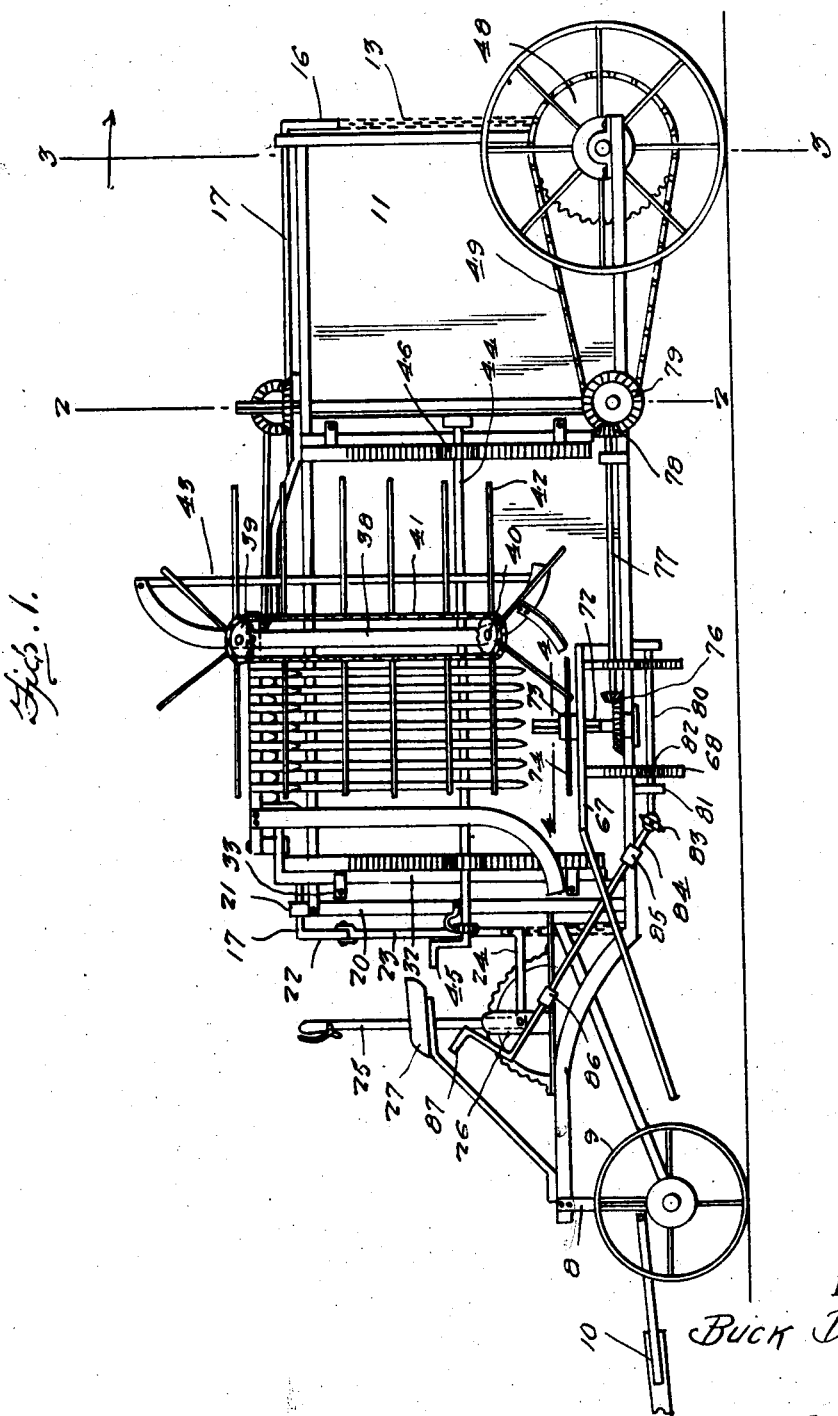

1,714,161

UNITED STATES PATENT OFFICE.

BUCK DEAN, OF ANSON, TEXAS.

GRAIN ROW HEADER.

Application filed April 4, 1927. Serial No. 180,835.

The present invention relates to a machine for heading grain, maize, and the like arranged in rows.

An important object of the machine lies in the provision of means for cutting the stems close to the ground then raising the severed portions of the stems and the heads thereon and severing the heads from the remaining portions of the stems and placing said heads in a receptacle.

Another important object of the invention lies in the provision of a machine of this nature having several important adjustments to accommodate different size grain.

A still further important object of the invention lies in a machine of this nature which is simple in its construction, easy to manipulate, thoroughly efficient and reliable in operation, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawings:

Figure 1 is a side elevation of the machine embodying the features of my invention, Figure 2 is a vertical transverse section therethrough taken substantially on the line 2—2 of Figure 1 looking to the left, Figure 3 is another vertical transverse section taken substantially on the line 3—3 of Figure 1 looking to the right, Figure 4 is an enlarged detail horizontal section taken substantially on the line 4—4 of Figure 1, Figure 5 is a fragmentary detail view of the cutter bar and frame, Figure 6 is an enlarged detail view showing the gearing for operating the cutter bar.

Referring to the drawing in detail it will be seen that the numeral 5 denotes the main frame of the machine which is mounted on a rear axle 6 rotatable with rear wheels 7 and on a front axle structure 8 of the dirigible type which is supported by front wheels 9. Any suitable draft means 10 may be utilized.

A receptacle 11 is mounted on the main frame adjacent the rear end thereof and extends forwardly of the rear axle 6 and is disposed adjacent one of the rear wheels 7. Hinged bottom sections 12 are mounted in the bottom of the receptacle 11 and are engaged by chains 13 which are connected to a link 14 which in turn is connected to a link 15 on the end of a crank 16 of a shaft 17 journalled in brackets or bearings 18 at the top of the receptacle 11 and extending longitudinally thereof. The crank 16 is adjacent the rear end of the receptacle as is clearly apparent from an inspection of Figure 1. A super frame structure is indicated generally by the numeral 20 and has a bearing 21 adjacent the forward end thereof in which the shaft 17 is journalled. The forward end of this shaft 17 has a depending crank 22 connected to link 23 engaged with a crank 24 of a lever 25. This lever 25 is pivoted on a bracket 26 and is disposed adjacent driver's seat 27. Obviously, by proper manipulation of the lever 25 the bottom sections 12 may be closed or opened.

A lateral frame structure 30 is disposed horizontally from one side of the main frame 5 forwardly of the receptacle 11 and from the inner side thereof the super frame 20 rises. Rack bars 31 are slidably mounted in the super frame 20 in any suitable manner preferably by having flanges 32 slidable in brackets 33 on one side of the receptacle 11. These rack bars 31 support a bar 33 having formed thereon cutter bar seats 34 and the slidable cutter bar 35 having blades 36. A plurality of spaced parallel bars 37 incline downwardly and to the side from bar 33. A bar 38 is mounted on the bar 33 to extend alongside of the bars 27 to the rear thereof and in parallelism therewith and has sprockets 39 and 40 mounted at the upper and lower end portions thereof with a chain 41 trained thereover and having a plurality of spaced fingers 42 projecting outwardly therefrom. The upper and lower extremities of the bar 38 are curved rearwardly and braced by rod 43. A shaft 44 is journalled in the super frame and is operable by a hand crank 45. Gears 46 are fixed to the shaft 44 and mesh with the rack bar 31 so that these rack bars 31 may be raised to raise and lower the cutter bar mechanism and the rake bars 37 and the chain and sprocket supporting bar 38. Thus these parts may be adjusted to the desired height. A sprocket 48 is fixed on the rear axle 6 and has a chain 49 trained thereover which is also trained over a sprocket 50 on a shaft 51 journalled transversely of frame 30. A bevel gear 52 on the shaft 51 meshes with a bevel gear 53 on a shaft 54 journalled in brackets 55 and 56. The upper end of the shaft 54 is square and has a bevelled gear 57 with a square opening thereon. This bevel gear 57 meshes with a bevel gear 58 on a shaft 59 supported by the bracket 56 on one of the rack bars 31. A bevel gear 61 is mounted on the shaft 59 and meshes with the bevel gear 62 on a shaft 63 on which is also disposed bevel gear 64 meshing with a bevel gear 65 operatively connected with sprocket 39.

A guide board 67 is supported on racks 68 slidably mounted in frame 30 and has a slot 69 with entrance guide fingers 70 and 71. A shaft 72 is slidable through the board 67 and has slidable thereon and rotatable therewith a hub 73 with knife blades 74 radiating therefrom. The shaft 72 is driven through gearing 76 operable by shaft 77 having a bevel gear 78 meshing with the bevel gear 79 on the shaft 51. A shaft 80 is journalled in brackets 81 on the frame 30 and has gears 82 fixed thereon and meshing with rack 68. A universal joint 83 connects the shaft 80 with a shaft 84 journalled in bearings 85 and 86. This shaft 84 terminates in a crank 87 adjacent the driver's seat. Obviously by manipulating the crank 87 the board 67 and the knife structure 73 74 may be raised and lowered in respect to the ground.

The operation of the machine may now be easily followed. As the machine is pulled forwardly it will be seen that the various mechanisms are set in operation because of the rotation of the rear axle through the chains and gearing as described. The grain of the row to be cut enters the slot 69 and is severed by the blades 74 and the fingers 42 force the grain to travel up the bars 37 the stems dangling therebetween and the heads thereabove until the heads are severed off of the stems by the cutter bar mechanism and are delivered over into the receptacle 11 and of course remaining portions of the stems fall on the ground.

It is thought that the construction, operation, adjustment, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A machine of the class described, including a wheeled frame, a board, rack bars supporting the board, means for mounting the rack bars to slide vertically on the frame, gears meshing with the rack bars, a shaft on which said gears are mounted, means for rotating the shaft, a second shaft extending vertically through an opening in the board, a hub slidable on and rotatable with the second shaft and resting on the board, and blades radiating from the hub, said board being provided with a longitudinally extending slot, leading toward and terminating adjacent the hub.

2. A machine of the class described including a wheeled frame, a board, rack bars supporting the board, means for mounting the rack bars to slide vertically on the frame, gears meshing with said rack bars, a shaft on which said gears are mounted, means for rotating the shaft, a second shaft extending vertically through an opening in the board, a hub slidable on and rotatable with the second shaft and resting on the board, blades radiating therefrom, said board being provided with a longitudinally extending slot leading toward and terminating adjacent the hub, an elevating means for elevating grain severed by said blades upwardly and to one side of the machine, a vertical shaft, means operatively connecting the third mentioned shaft with the first mentioned shaft, a gear slidable on the third mentioned shaft and rotatable therewith, a rack bar, means for mounting the last mentioned rack bar for vertical movement, gear means associated with said last mentioned rack bar, to raise and lower the same, a bracket arm extending from said rack bar, through which the third mentioned shaft extends, a gear resting on said arm, and means operatively connecting the gear with the elevating mechanism.

In testimony whereof I affix my signature.

BUCK DEAN.